Oct. 14, 1958 H. C. HOWSAM 2,856,137
DISPOSABLE REEL
Filed April 16, 1956

INVENTOR.
Hilyard C. Howsam
BY
Brown, Jackson, Boettcher & Dienner
Attys.

United States Patent Office 2,856,137
Patented Oct. 14, 1958

2,856,137

DISPOSABLE REEL

Hilyard C. Howsam, Aurora, Ill.

Application April 16, 1956, Serial No. 578,359

2 Claims. (Cl. 242—118.7)

The present invention relates to reels for containing wire and the like, and particularly, to an improved reel of such economical construction that the same may be disposed of after one use without appreciable or effective loss.

In the wire handling art, it is customary to wind wire onto reels for transportation and to accommodate convenient dispensing of the wire. When emptied, the reel is customarily returned to the wire company for reuse. However, the reels are just as bulky when empty as when full, and the necessity for returning the same is an inconvenience, and is costly, both in terms of time and expense, yet not so inconvenient or expensive as to offset the initial cost of the reel. A reel having such low initial cost as to render return thereof at least economically infeasible, and therefore rendering the reel disposable, is a much sought after objective. However, the demanding requirements of the art for strength, rigidity and concentricity of the reels, and for parallelism of the reel heads, have been practically insurmountable obstacles to attainment of the stated objective.

The present invention has for its principal object the provision of an improved reel satisfying the specifications of the art, and yet of such economical construction as to render disposal thereof after one use not only feasible but recommended.

A further object of the invention is the provision of an improved reel comprising a wire frame, a paper hub and wooden heads affording low material cost.

A still further object of the invention is the provision of a novel assembly of the said frame, hub and heads of the reel resulting in low assembly cost and yet insuring strength, rigidity and concentricity of the reel, and parallelism of the reel heads, in the completed structure.

It is a particular object of the invention to provide a novel reel which in both assembly and use avoids dishing of the reel heads.

Another specific object of the invention is the provision in a reel of a central support extending between the reel heads to assist in mitigating dishing of the heads and in maintaining parallelism of the heads.

Other objects and advantages of the invention will become apparent in the following detailed description of a preferred embodiment of the invention.

Now, in order to acquaint those skilled in the art with the manner of making and using my disposable reel, I shall describe, in connection with the accompanying drawing, a preferred embodiment of the reel and a preferred manner of making the same.

Figure 1:
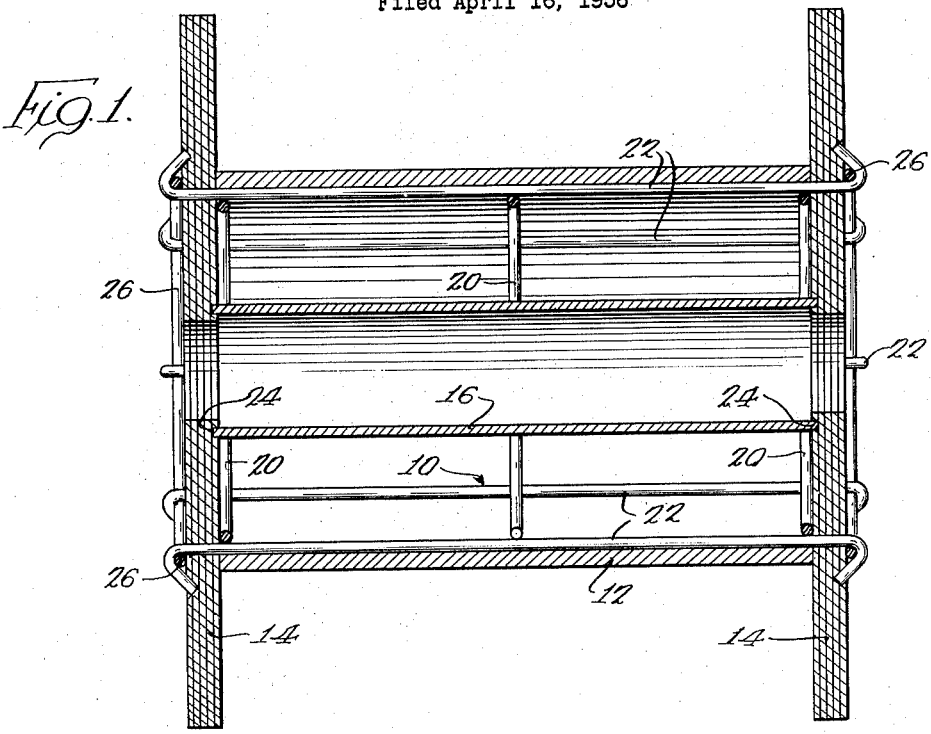
Figure 1 is a longitudinal cross-section of the reel of the invention.
Figure 2:
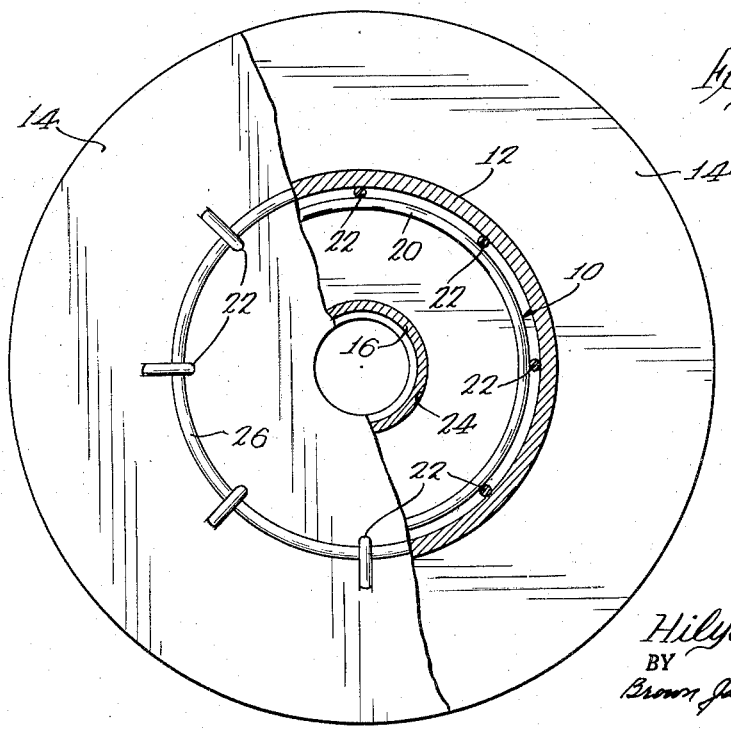
Figure 2 is an end view of the reel, partly in section and partly in elevation.

Referring now to the drawings, I have shown my improved reel as comprising, generally, a frame 10, a hub 12, a pair of heads 14 and a central support member 16.

The frame 10 is preferably formed of steel wire and comprises a plurality of spaced parallel axially aligned circular hoops 20, suitably three in number, and a plurality of longitudinally extending parallel rods 22 of equal length, suitably eight in number, secured, as by welding, at equal circumferential spacings to the exterior of the hoops. One hoop is preferably disposed centrally of the length of the rods and the other two hoops are disposed adjacent but spaced from the opposite ends of the rods, thus to afford a rigid economical frame.

The hub 12 is cylindrical, of an inner diameter to fit snugly over the rods 22 of the frame, and of a length equal substantially to the distance between the outboard sides of the outboard frame hoops 20. The hub is fitted intimately on the frame with the outboard hoops received immediately within the opposite ends thereof. The hub is preferably formed of paper in its most economical embodiment and may, for example, comprise a chipboard spiral wound cylinder. A convolute winding may also be employed, and in some instances, the cylinder may be formed of kraft paper. Depending upon the use to which the reel is to be put, the hub may, if desired or necessary, be formed of Masonite, plywood, steel and other materials.

The heads 14 each comprise an annulus having an inner diameter substantially less and an outer diameter substantially greater than the diameter of the frame 10 and hub 12. Radially outwardly of its center hole, on a circle concentric with the head, frame and hub, and of a diameter equal to that of the frame, each head is provided with circumferentially spaced apertures therethrough of the same number as and aligned with the rods 22 of the frame. The heads 14 are assembled on the opposite ends of the frame 10 by passing the freely extending end portions of the rods 22 through the apertures in the heads. The end portions of the rods 22 are of a length greater than the thickness of the heads 14 to extend beyond the exterior surfaces of the heads when the heads abut at their inner surfaces against the outboard hoops 20 of the frame and the opposite ends of the hub 12. Preferably, the portions of the rods extending beyond the outer surfaces of the heads are each of a length slightly greater than the radial thickness of the hub 12. The heads 14 are preferably formed of plywood for strength, resistance to fracture upon impact, and economy, but may also be formed of fibre and other known materials.

The support member 16 preferably comprises a tubular member of a diameter less than that of the frame 10 and slightly greater than that of the center hole in the reel heads, and of a length slightly greater than the hub 12. The heads 14 are each provided in the inner surface thereof with a concentric annular groove 24 of a size snugly to receive one end of the supporting tube 16, the depth of the two grooves being equal substantially to the excess length of the tube 16 as compared to the hub 12. For the sake of economy, the support member 16 preferably comprises a paper tube, such as a chipboard spiral wound tube, but the same could also be a convolute winding, and could suitably be formed of kraft paper, Masonite, or plywood rolled up and joined at the seam. Alternatively, the support 16 could comprise a plurality of longitudinally extending staves.

To assemble the components above described, the hub 12 is slipped onto the frame 10 and into the position described, and one head 14 is mounted on the free ends of the rods 22 at one end of the frame. The supporting tube 16 is then fitted at one end into the groove 24 in the head mounted on the frame. Thereafter, the other head is mounted on the free ends of the rods at the opposite end of the frame, care being exercised in assembly to insure that the tube 16 enters at its end into the groove 24 in the said head. As thus mounted, the heads 14 engage at their inner surfaces against the outboard hoops 20 of the frame 10, the opposite ends of the hub 12 and, adjacent their central portions, the opposite ends of the support 16.

The components of the reel are then secured in the said assembled state simply, yet advantageously, by bending the extending end portions of the rods 22 into engagement with the exterior surfaces of the heads 14. As the rods are bent, the heads 14 are forced firmly into engagement with the outboard hoops 20 of the frame 10, the opposite ends of the hub 12 and the opposite ends of the support 16 to afford a rigid assembly thereof.

To facilitate bending of the rod ends, a wire ring or hoop 26 of a diameter to abut against the rods 22 is disposed coaxially of the other components of the reel to the outboard side of each head 14. In the preferred embodiment illustrated, the ring has an inner diameter equal substantially to the outer diameter of the frame and is slipped over the extending end portions of the rods 22. The rod ends are preferably bent radially outward and are thus bent over the ring 26 whereby the ring is forced against the outer surface of the respective head and defines a fulcrum about which the rods are bent. Moreover, with the ring 26 in position, the rod ends are bent into a relatively sharp hook and the ends thereof are imbedded in the head. Due to the formation of a hook, the rod ends very firmly resist outward movement of the heads under the pressure of wire wound on the reel.

In securing the heads to the remainder of the reel structure by bending ends of the rods radially outwardly and then toward the heads, the force which is exerted will not cause dishing of the heads because it is applied against the ends of the hub 12. Such arrangement and assembly retains the heads in parallel relation to one another. The central support 16 assists in mitigating dishing and supports the central portions of the head, whereby the reel heads are maintained parallel in the assembly despite abuse to which the reel may subsequently be subjected.

In use then, the heads are fully supported and rigidified by the frame, the hub and the support. The frame itself resists damage to the central portion of the reel in that, if the reel is dropped and the hub thereof hits a hard object, or a like blow is imparted to the hub, the shock will be taken by the hoops 20 and transmitted thereby to all the longitudinal rods 22, thus to distribute the impact over the whole frame and hub and prevent deformation of the individual components. The utilization of the rods 22 to secure the frame, hub, heads and support together in a strong, rigid, concentric assembly simplifies the construction and is especially advantageous in terms of economy. Of particular importance is the bending of the rods outwardly to mitigate dishing and to maintain parallelism of the heads, whereby the strict specifications of the reel art are satisfied. Moreover, the reel is particularly economical, both in material cost and cost of assembly, and may be provided at such low price as to render the same disposable after one use.

While I have shown and described what I regard to be a preferred embodiment of my invention, it is to be appreciated that various changes, rearrangements and modifications may be made therein without departing from the scope of the invention, as defined by the appended claims.

I claim:

1. A disposable reel comprising a wire frame including a plurality of spaced hoops and a plurality of rods secured in spaced relation to said hoops, two of said hoops being disposed adjacent but spaced from the opposite ends of said rods, a pair of heads mounted on said frame at the opposite ends thereof, the end portions of said rods extending through said heads, and a ring disposed to the outboard side of each head, the end portions of said rods being bent into generally hook form around said rings to force said heads firmly into engagement respectively with said two hoops and to retain said heads in such position.

2. A disposable reel comprising a wire frame including a plurality of spaced parallel axially aligned circular hoops and a plurality of longitudinally extending parallel rods of equal length secured at equal circumferential spacings to the exterior of said hoops, two of said hoops being disposed adjacent but spaced from the opposite ends of said rods, a cylindrical paper hub fitting intimately over said rods and extending from one to the other of said two hoops, a pair of annular wooden heads mounted on said frame at the opposite ends thereof in axial alignment with said hoops and said hub, said heads being of a diameter greater than said hub and each having a plurality of circumferentially spaced holes therein provided on a circle concentric with the axis of the head and aligned with said rods, the end portions of said rods extending through said holes and beyond the exterior surfaces of said heads, a ring fitted over the extending end portions of said rods to the exterior of each of said heads, the end portions of said rods being bent radially outward around said rings into hook form, the hooks at their ends engaging the exterior surfaces of said heads to force the interior surfaces of said heads firmly into engagement respectively with said two hoops and the opposite ends of said hub, the ends of said rods being bent radially outward to overlie said rings and the opposite ends of said hub to mitigate dishing of said heads, said heads each having a concentric annular groove in the interior surface thereof within the interior of said frame adjacent the center of said heads, and a paper tube of a diameter equal to that of said grooves and of a length slightly greater than said hub fitting at its opposite ends into said grooves and bearing against the interior surfaces of said heads adjacent the centers thereof to prevent dishing of said heads.

References Cited in the file of this patent

UNITED STATES PATENTS

| | | |
|---|---|---|
| 1,105,028 | Gill | July 28, 1914 |
| 1,795,529 | Watson et al. | Mar. 10, 1931 |
| 1,850,265 | German | Mar. 22, 1932 |
| 1,984,738 | Gleason | Dec. 18, 1934 |
| 2,003,663 | Ellstrom et al. | June 4, 1935 |
| 2,285,732 | Markle | June 9, 1942 |